(12) United States Patent
Nakamura

(10) Patent No.: US 8,436,886 B2
(45) Date of Patent: May 7, 2013

(54) OPTICAL SCANNING DEVICE AND IMAGE FORMING APPARATUS

(75) Inventor: Tadashi Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 524 days.

(21) Appl. No.: 12/204,483

(22) Filed: Sep. 4, 2008

(65) Prior Publication Data
US 2009/0073523 A1 Mar. 19, 2009

(30) Foreign Application Priority Data
Sep. 13, 2007 (JP) .................... 2007-238145

(51) Int. Cl.
B41J 2/435 (2006.01)
B41J 27/00 (2006.01)

(52) U.S. Cl.
USPC .................... 347/248; 347/256; 347/259

(58) Field of Classification Search .......... 347/248, 347/260, 256, 259
See application file for complete search history.

(56) References Cited

U.S. PATENT DOCUMENTS

| | | | |
|---|---|---|---|
| 6,757,089 B2 | 6/2004 | Hayashi | |
| 2004/0041895 A1* | 3/2004 | Tajima | 347/116 |
| 2006/0017801 A1* | 1/2006 | Suzuki et al. | 347/248 |
| 2006/0268023 A1* | 11/2006 | Toyama et al. | 347/2 |
| 2007/0146851 A1* | 6/2007 | Nakajima | 359/206 |
| 2007/0297036 A1 | 12/2007 | Nakamura et al. | |
| 2008/0055690 A1 | 3/2008 | Nakamura et al. | |
| 2008/0062491 A1 | 3/2008 | Nakamura et al. | |
| 2008/0192323 A1 | 8/2008 | Nakamura et al. | |
| 2008/0204841 A1 | 8/2008 | Suzuki et al. | |
| 2008/0218829 A1 | 9/2008 | Nakamura | |

FOREIGN PATENT DOCUMENTS

| | | |
|---|---|---|
| JP | 2002-82303 | 3/2002 |
| JP | 2002-258204 | 9/2002 |
| JP | 2002-277801 | 9/2002 |
| JP | 2005-215571 | 8/2005 |
| JP | 2007-86335 | 4/2007 |

OTHER PUBLICATIONS

U.S. Appl. No. 12/170,063, filed Jul. 9, 2008, Nakamura et al.
U.S. Appl. No. 12/023,414, filed Jan. 31, 2008, Tadashi Nakamura.
Japanese Office Action issued Dec. 6, 2011, in Patent Application No. 2007-238145.

* cited by examiner

Primary Examiner — Stephen Meier
Assistant Examiner — Sarah Al Hashimi
(74) Attorney, Agent, or Firm — Oblon, Spivak, McClelland, Maier & Neustadt, L.L.P.

(57) ABSTRACT

In an optical scanning device, a light-source driving unit drives a light source to modulate a light beam in units of single dot, a deflecting unit deflects the light beam, and a scanning optical system guides the deflected light beam to a scanning surface having an active writing area for forming an image. A static beam spot size, which is a beam spot size of the light beam on the scanning surface when the light beam passes a predetermined image height, is set such that a scanning beam spot size, which is a beam spot size of the light beam on the scanning surface when the light beam is moved to scan during the light beam exposes a single dot, is kept substantially constant.

15 Claims, 10 Drawing Sheets

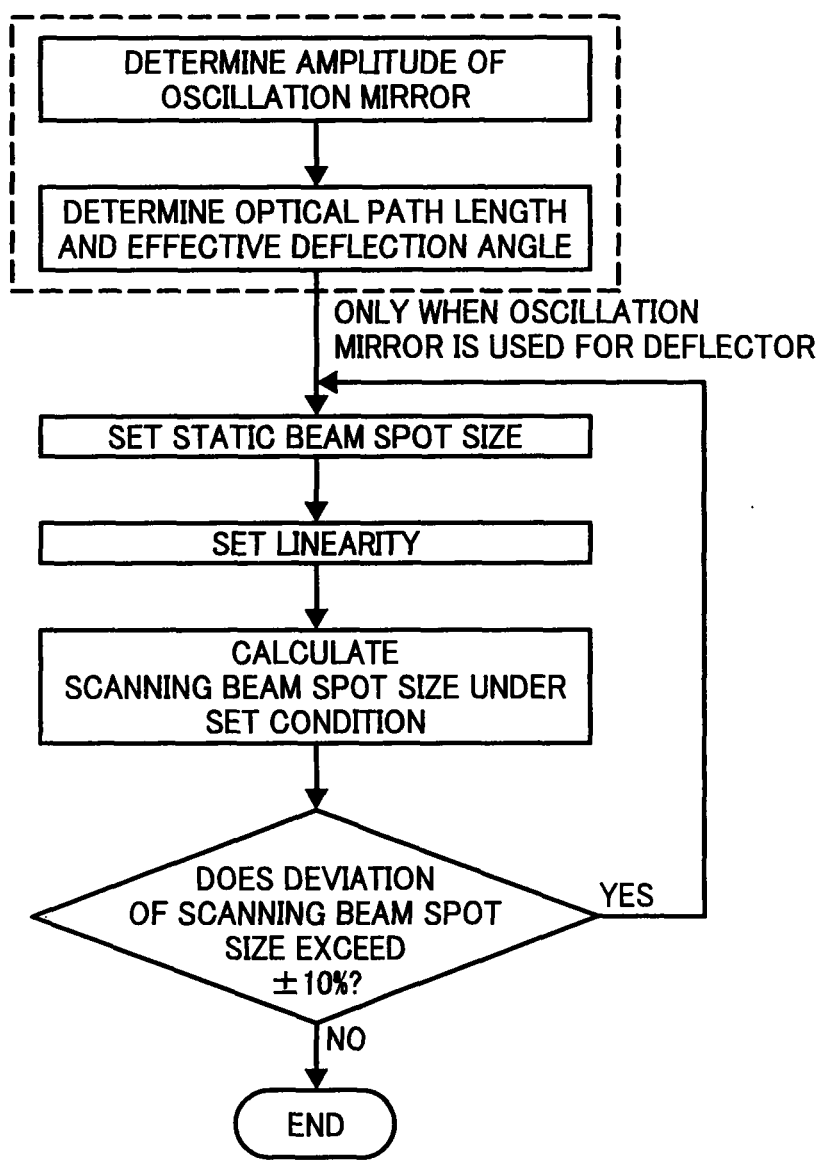

OPTICAL SCANNING DEVICE AND IMAGE FORMING APPARATUS

CROSS-REFERENCE TO RELATED APPLICATIONS

The present application claims priority to and incorporates by reference the entire contents of Japanese priority document 2007-238145 filed in Japan on Sep. 13, 2007.

BACKGROUND OF THE INVENTION

1. Field of the Invention

The present invention relates to an optical scanning device and an image forming apparatus.

2. Description of the Related Art

Conventionally, there has been known an optical scanning device, in which light beam is deflected by an optical deflecting unit, and the deflected light beam is focused on a scanning surface as a fine spot beam, so that the scanning surface is scanned at a constant speed in a main scanning direction, and is applied to a latent-image writing unit in an image forming apparatus such as a laser printer, a laser-beam plotter, a facsimile machine, and a digital copying machine. The optical scanning device writes an image on the scanning surface by deflecting a laser beam emitted from a laser light source, such as a semiconductor laser, by the optical deflecting unit to scan the scanning surface such as an image carrier, and at the same time, with intensity modulation of the laser light source based on image signals.

As the optical deflecting unit, a polygon mirror that rotates at a constant velocity is widely used. As a scanning lens that focuses the deflected light beam on the scanning surface, an f0 lens is generally used. The f0 lens makes the scanning speed of the deflected light beam at each scanning position on the scanning surface substantially constant, and the beam spot size substantially uniform.

Meanwhile, a micromirror that uses micromachining technology to generate sine wave oscillation of a resonant structure has been proposed. The polygon mirror is a large device, and accompanies mechanical high-speed rotation. Therefore, there are problems of banding due to vibration, temperature rise, noise, and power consumption increase. On the other hand, if the micromirror is used as the deflecting unit in the optical scanning device, the device is downsized, and the above problems can be considerably reduced.

By using the micromirror that generates sine wave oscillation instead of the polygon mirror, low noise and low power consumption can be realized, thereby enabling to provide an image forming apparatus suitable for an office environment.

Furthermore, by using the micromirror that generates sine wave oscillation instead of the polygon mirror, an environmentally-friendly image forming apparatus can be provided due to its lower power consumption.

However, the conventional technique has the following problems. That is, in the optical scanning device using the polygon mirror and the f0 lens, the scanning speed at each scanning position on the scanning surface may not be completely corrected until constant speed scanning is realized over a whole active writing area. The lack of correction can occur at the time of reducing the thickness of the scanning lens for cost reduction. Generally, in the optical scanning device using the polygon mirror and the f0 lens, a static beam spot size (diameter of light beam in an arbitrary image height on the scanning surface) at each scanning position is substantially constant. In this case, if a light source is modulated with the same emitted pulse width at each scanning position, as the respective scanning speeds become different, scanning distances become different, and as a result, the scanning beam spot sizes become different. The difference in spot size of the scanning beam that exposes the surface of a photoconductor at respective scanning positions generates a difference in a dot diameter and density in each area of the image, thereby leading to degradation of the image.

On the other hand, when the micromirror that generates sine wave oscillation is used as the deflecting unit, a deflecting angle sinusoidally changes. Therefore, when the f0 lens used for the current writing optical system is used for a scanning imaging optical system, the scanning speed becomes slow in a peripheral image height, and therefore the scanning speed on the scanning surface is not constant. Also in this case, degradation of the image occurs.

With respect to this problem, Japanese Patent Application Laid-open No. 2005-215571 describes an optical scanning device having a wide effective writing width, and that an excellent scanning constant-speed characteristic can be obtained by using a scanning imaging optical system (f·arcsin lens) having an imaging characteristic (f·arcsin characteristic) as shown by the following equation:

$$H = K \times \sin^{-1}(\phi/2\phi_0)$$

where H denotes an image height, K denotes a constant of proportion, $\phi$ denotes a deflection angle, and $\phi_0$ denotes an amplitude, and by optically correcting a waist position of main scanning light beam. However, if the above optical correction is performed, a deviation of the spot size of the main scanning light beam between image heights increases on the scanning surface, thereby causing degradation of image quality.

In the optical scanning device using the micromirror that generates sine wave oscillation as the deflecting unit, there is a tradeoff relationship between the scanning constant-speed characteristic and the deviation of the spot size of the main scanning light beam on the scanning surface between image heights, and an optical scanning device having the excellent scanning constant-speed characteristic and deviation of the spot size between image heights to form an excellent image cannot be provided.

Japanese Patent Application Laid-open No. 2002-258204 and Japanese Patent Application Laid-open No. 2002-82303 describe an optical scanning device using a micromirror that generates sine wave oscillation as a deflecting unit, where optical correction of the waist position of a main scanning light beam is not performed by using the optical scanning device having an imaging characteristic as shown in the above equation, but a deflection angle of the micromirror is decreased with respect to the maximum amplitude. In the deflection speed in this case, a linear change is predominant rather than a sinusoidal change, to obtain both an excellent scanning constant-speed characteristic and an excellent deviation of the spot size of the main scanning light beam between image heights. However, because the deflection angle of the micromirror is decreased, the size of the optical scanning device increases to obtain an effective writing width required at the time of forming the image, thereby restricting the size of the apparatus.

SUMMARY OF THE INVENTION

It is an object of the present invention to at least partially solve the problems in the conventional technology.

According to an aspect of the present invention, there is provided an optical scanning device including a light source that emits a light beam; a light-source driving unit that drives the light source to modulate the light beam in units of single dot; a deflecting unit that deflects the light beam; and a scanning optical system that guides the light beam deflected by the deflecting unit to a scanning surface having an active writing area for forming an image, wherein a static beam spot size, which is a beam spot size of the light beam on the scanning surface when the light beam passes a predetermined image height, is set such that a scanning beam spot size, which is a beam spot size of the light beam on the scanning surface when the light beam is moved to scan during the light beam exposes a single dot, is kept substantially constant.

According to another aspect of the present invention, there is provided an image forming apparatus including an image carrier for forming a latent image thereon; a charging unit that charges the image carrier; a latent-image forming unit that forms a latent image on the image carrier; a developing unit that develops the latent image formed on the image carrier with toner to form a toner image on the image carrier; a transfer unit that transfers the toner image formed on the image carrier onto a recording medium; and a fixing unit that fixes the toner image transferred onto the recording medium, wherein the latent-image forming unit includes an optical scanning device including a light source that emits a light beam, a light-source driving unit that drives the light source to modulate the light beam in units of single dot, a deflecting unit that deflects the light beam, and a scanning optical system that guides the light beam deflected by the deflecting unit to a scanning surface having an active writing area for forming an image, and a static beam spot size, which is a beam spot size of the light beam on the scanning surface when the light beam passes a predetermined image height, is set such that a scanning beam spot size, which is a beam spot size of the light beam on the scanning surface when the light beam is moved to scan during the light beam exposes a single dot, is kept substantially constant.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a flowchart of a process of obtaining a relationship between a static spot size and a dynamic spot size;

DETAILED DESCRIPTION OF THE PREFERRED EMBODIMENTS

Exemplary embodiments of the present invention are explained in detail below with reference to the accompanying drawings.

Figure 1:
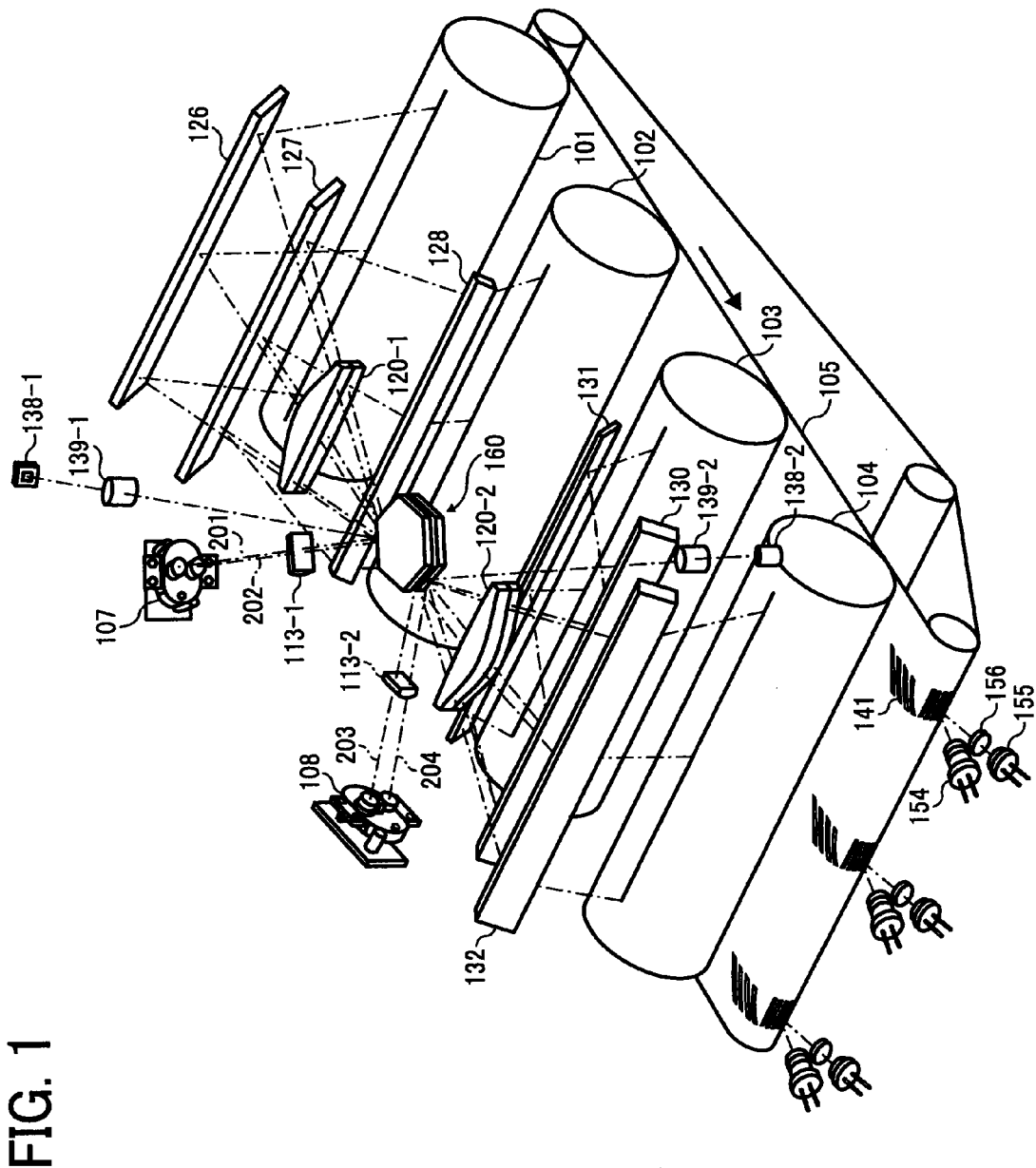
FIG. 1 is a schematic diagram for explaining a method of scanning four stations by a single polygon mirror according to a first embodiment of the present inventing.

FIG. 1 depicts a method of scanning four stations by a single polygon mirror according to a first embodiment of the present invention.

In FIG. 1, reference numerals 101 to 104 denote photosensitive drums, 105 denotes a transfer belt, 107 and 108 denote light source units, and 160 denotes a polygon mirror. Other reference numerals will be referred to anytime as required.

The optical scanning device that scans each photosensitive drum is integrally formed, in which beams from the light source corresponding to each of the four photosensitive drums 101, 102, 103, and 104 arranged along a moving direction of the transfer belt 105 with an equal interval are deflected in the main scanning direction by the polygon mirror 160 and then divided again and guided toward each photosensitive drum. The four photosensitive drums are respectively rotated in a sub-scanning direction, thereby forming a two-dimensional image.

The polygon mirror 160 has a two-stage structure, and the beams from the respective light sources are made to be incident on the upper and lower stages thereof, so that the beams from the respective light sources are collectively deflected and scanned. Because one polygon mirror scans a plurality of scanning areas, low cost can be realized.

In the light source units 107 and 108, light sources for two stations are respectively arranged in the sub-scanning direction. Respective light sources can be directly attached to a housing, instead of the configuration of the light source unit. Furthermore, respective light sources can be semiconductor laser arrays having two or more luminous points to achieve speedup. In this case, only an optical path of the beam from one representative luminous point is shown in FIG. 1.

Figure 2A:
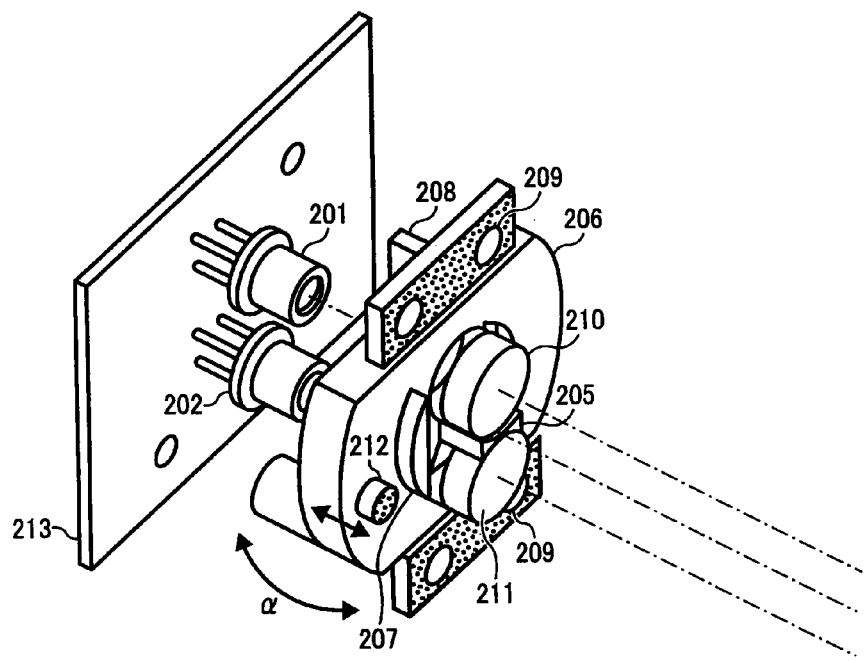
FIGS. 2A and 2B are perspective views of a light source unit according to the first embodiment.
Figure 2B:
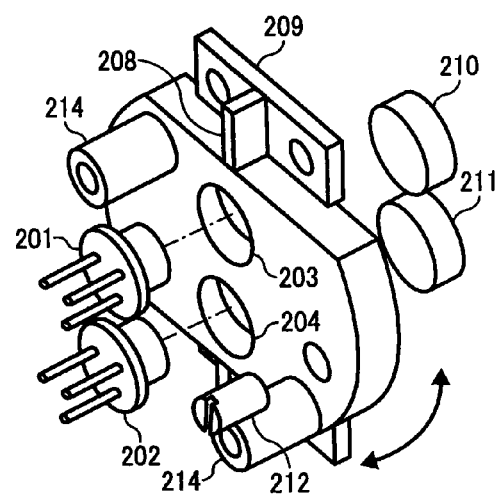

FIGS. 2A and 2B are perspective views of the light source unit, where FIG. 2A is a front-side perspective view, and FIG. 2B is a back-side perspective view.

In FIGS. 2A and 2B, reference numerals 201 and 202 denote semiconductor lasers, 203 and 204 denote fitting holes, 205 denotes a protrusion, 206 denotes a holder member, 207 denotes a cylindrical protrusion, 208 denotes a supporting member, and 209 denotes a clamping bearing surface, respectively.

The semiconductor lasers 201 and 202 are press-fitted and fixed to the fitting holes 203 and 204 formed in the holder member 206 from a back side, with a rotation direction along a circumference of a stem being positioned based on the circumference of the stem.

Positioning of the protrusion 205 having a U-shaped recess on upper and lower faces in a direction of an optical axis is performed with respect to the luminous point, so that the optical axis of coupling lenses 210 and 211 match an emission axis of each semiconductor laser 201 and 202, and the emitted light beam becomes divergent light beam. An ultraviolet (UV) adhesive is filled and cured in a gap between the protrusion 205 and the coupling lenses 210 and 211 to fix the coupling lenses 210 and 211. The light source unit is fixed with a screw with respect to a housing mounting surface, which is orthogonal to an emission axis C (not shown), with the clamping bearing surface 209 being abutted against the housing mounting surface. The clamping bearing surface 209 coupled via the supporting member 208 are integrally formed with the holder member 206 at upper and lower parts thereof, designating the cylindrical protrusion 207 formed on the holder member 206 as a positioning reference.

The beams emitted from the light source units 107 and 108 are converged in the sub-scanning direction near a reflecting surface of the polygon mirror 160 by cylinder lenses 113-1 and 113-2 (hereinafter, also referred to as "cylinder lens 113" as appropriate), and after being deflected, the beams are incident on f0 lenses 120-1 and 120-2 (hereinafter, also referred to as "f0 lens 120" as appropriate), respectively.

The f0 lenses 120 are formed in upper and lower stages, so that the respective beams deflected by the upper and lower stages of the polygon mirrors 160 are focused with a predetermined beam spot size on the surfaces of the photosensitive drums 101, 102, 103, and 104.

The beam 201 (denoted with the same reference numeral with the light source) emitted from the upper-stage light source 201 of the light source unit 107, of the beams from the respective light source units having passed through the f0 lens 120, is reflected by a folding mirror 126 and focused in a spot on the photosensitive drum 101, to form a latent image based on image information of yellow color as a first image forming station.

The lower beam 202 emitted from the light source unit 107 is reflected by folding mirrors 127 and 128 and focused in a spot on the photosensitive drum 102, to form a latent image based on image information of magenta color as a second image forming station.

The lower beam 204 emitted from the light source unit 108 is reflected by folding mirrors 130 and 131 and focused in a spot on the photosensitive drum 103, to form a latent image based on image information of cyan color as a third image forming station.

The upper beam 203 emitted from the light source unit 108 is reflected by a folding mirror 132 and focused in a spot on the photosensitive drum 104, to form a latent image based on image information of black color as a fourth image forming station.

The optical beams deflected by the polygon mirror 160 pass by the side of the f0 lens 120, and are focused by imaging lenses 139-1 and 139-2 (hereinafter, also referred to as "imaging lens 139" as appropriate), to be incident on synchronization detection sensors 138-1 and 138-2 (hereinafter, also referred to as "synchronization detection sensor 138" as appropriate). The synchronization detection sensor 138 generates a synchronization detection signal for each station based on the detection signal thereof.

A detector for detecting superimposition accuracy of respective color images formed in each station and superimposed is arranged in an outlet roller unit of the transfer belt 105. The detector reads a detection pattern of a toner image formed on the transfer belt 105 to detect main scanning registration and sub-scanning registration as a deviation from a reference station, thereby performing correction control regularly.

In the first embodiment, the detector includes an LED device 154 for illumination, a photo sensor 155 that receives reflected light, and a pair of collective lenses 156, and is arranged at three positions of left and right ends and the center of the image, to read a difference in detection time from black as a reference color, with a movement of the transfer belt.

A lens surface of the f0 lens 120 close to the polygon mirror 160 is designated as a plane of incidence 120a, and a lens surface far from the polygon mirror 160 is designated as a plane of emission 120b. The distance from the polygon mirror 160 to the plane of incidence 120a is 31.52 millimeters, and the distance from the plane of emission 120b to the respective photosensitive drums 101, 102, 103, and 104 is respectively 176 millimeters.

When a paraxial radius of curvature in the main scanning direction is denoted by Rm, a paraxial radius of curvature in the sub-scanning direction is denoted by Rs, a thickness of the f0 lens 120 is denoted by D, and a refractive index in used wavelength of 780 nanometers is denoted by N, design data of each plane is as shown in Table 1 below.

TABLE 1

| Plane | Rm | Rs | D | N |
| --- | --- | --- | --- | --- |
| 120a | 179.00 | 96.40 | 19.33 | 1.5240 |
| 120b | −157.26 | −19.33 | | |

The shapes of respective planes 120a and 120b can be expressed by the following equation (1).

$$X(Y,Z)=(1/Rm)\cdot Y^2/\{1+\sqrt{(1-(1+a_0)\cdot(1/Rm)^2\cdot Y^2)}\}+a_4\cdot Y_4+a_6\cdot Y_6+\ldots +Cs(Y)\cdot Z^2/\{1+\sqrt{(1-Cs(Y)^2\cdot Z^2)}\}+(f_0+f_1\cdot Y+f_2\cdot Y^2+\ldots)\cdot Z \text{ where } Cs(Y)=1/Rs+b_2\cdot Y^2+b_4\cdot Y^4+\ldots \quad (1)$$

Each coefficient in the equation (1) in each plane is as follows.
(Plane 120a)

$a_0 = -5.36E+01$ $a_4 = -1.38E-06$ $a_6 = -1.58E-09$ $a_8 = 3.66E-12$ $a_{10} = -8.31E-15$ $a_{12} = 1.13E-17$ $a_{14} = -5.98E-21$ where, $E+01 = \times 10^{01}$, $E-07 = \times 10^{-07}$, and have the same meaning hereinafter.
(Plane 120b)

$a_0 = 1.95E+00$ $a_4 = -9.04E-07$ $a_6 = -1.04E-09$ $a_8 = 1.33E-12$ $a_{10} = -3.01E-15$ $a_{12} = 3.40E-18$ $a_{14} = -1.39E-21$ $b_1 = -2.08E-05$ $b_2 = 1.68E-05$ $b_3 = -1.08E-08$ $b_4 = -1.02E-08$ $b_5 = 4.96E-12$ $b_6 = 9.77E-14$

A ratio of scanning speed (hereinafter, "linearity") at the peripheral image height (±108 millimeters) based on the scanning speed at a central image height (image height 0 millimeter) on the scanning surface is as shown in Table 2 below.

TABLE 2

| | Image height [mm] | | |
|---|---|---|---|
| | −108 | 0 | +108 |
| Linearity [%] | −2.2 | 0.0 | −0.6 |

FIG. 3 is a flowchart of a process of obtaining a relationship between a static spot size and a dynamic spot size.

A power with respect to each image height of the f$\theta$ lens 120 is determined so that a diameter of the light beam (beam spot size) of the beams from the light source at an arbitrary image height on the scanning surface becomes a predetermined size by passing through the f$\theta$ lens 120. The beam spot size can be confirmed as a beam spot size when the angle of the polygon mirror is set in a static state so that the beams become the predetermined image height. Therefore, the beam spot size in this sense is referred to as a static beam spot size.

On the other hand, a beam spot size received on the scanning surface at each image height by light emission for one dot, in a state with the polygon mirror 160 being driven, is referred to as a scanning beam spot size.

The scanning beam spot size is obtained when the static beam spot size changes due to the linearity of the scanning speed. However, because the relationship between these is not mathematized, the static beam spot size for obtaining a desired scanning beam spot size is calculated by repeating the procedure as shown in FIG. 3. Because an amount of calculation is huge, a numerical value is fixed when it is within a predetermined error range.

In the present invention, the static beam spot size at each image height is set as shown in Table 3 below, to eventually equalize an exposure amount for each pixel.

TABLE 3

| | Image height [mm] | | |
|---|---|---|---|
| | −108 | 0 | +108 |
| Static beam spot size in main scanning direction [μm] | 70.1 | 68.5 | 69.8 |

A short period of time is required by the light source for performing drawing for one dot, upon reception of one-pulse drive command from a drive controller. Therefore, when the polygon mirror 160 is rotated, the beam spot moves in the main scanning direction within the time. Accordingly, the light beam received on the scanning surface for one dot becomes an elliptic spot, with the static beam spot size slightly moving in the main scanning direction. When the moving speed of the beam is different, the length of the ellipse in the main scanning direction becomes different. Therefore, the spot size received on the scanning surface needs to be made uniform regardless of the image height, including a changed portion in the size of the spot size generated due to the movement.

The static beam spot size shown in Table 3 has a value such that the scanning beam spot size becomes uniform. The scanning beam spot size at each image height when one dot of 600 dots per inch (dpi) (42.3 micrometers) is scanned becomes as shown in Table 4 below, where ratio deviation of 2.4% of the static beam spot diameter between image heights in Table 3 is reduced to 0.8%, which can be said as substantially constant. The ratio deviation of the static beam spot size between image heights is obtained by dividing a difference between the maximum value and the minimum value of the beam spot size due to the image height by a spot size at the central image height, which is an index indicating uniformity of the beam spot size in the active writing area. By equalizing the scanning beam spot size, taking into consideration the scanning speed at each image height, exposure stability at each dot position in the active writing area for forming an image can be increased, thereby enabling to form a stable image.

TABLE 4

| | Image height (mm) | | |
|---|---|---|---|
| | −108 | 0 | +108 |
| Scanning beam spot size [μm] | 86.9 | 86.3 | 87.0 |

In the first embodiment, the scanning beam spot size can be equalized in the whole active writing area. However, because the scanning speed is different at each image height, the dot position in the main scanning direction needs to be adjusted. Accordingly, correction of the dot position in the main scanning direction is performed simultaneously as described below.

Figure 4:
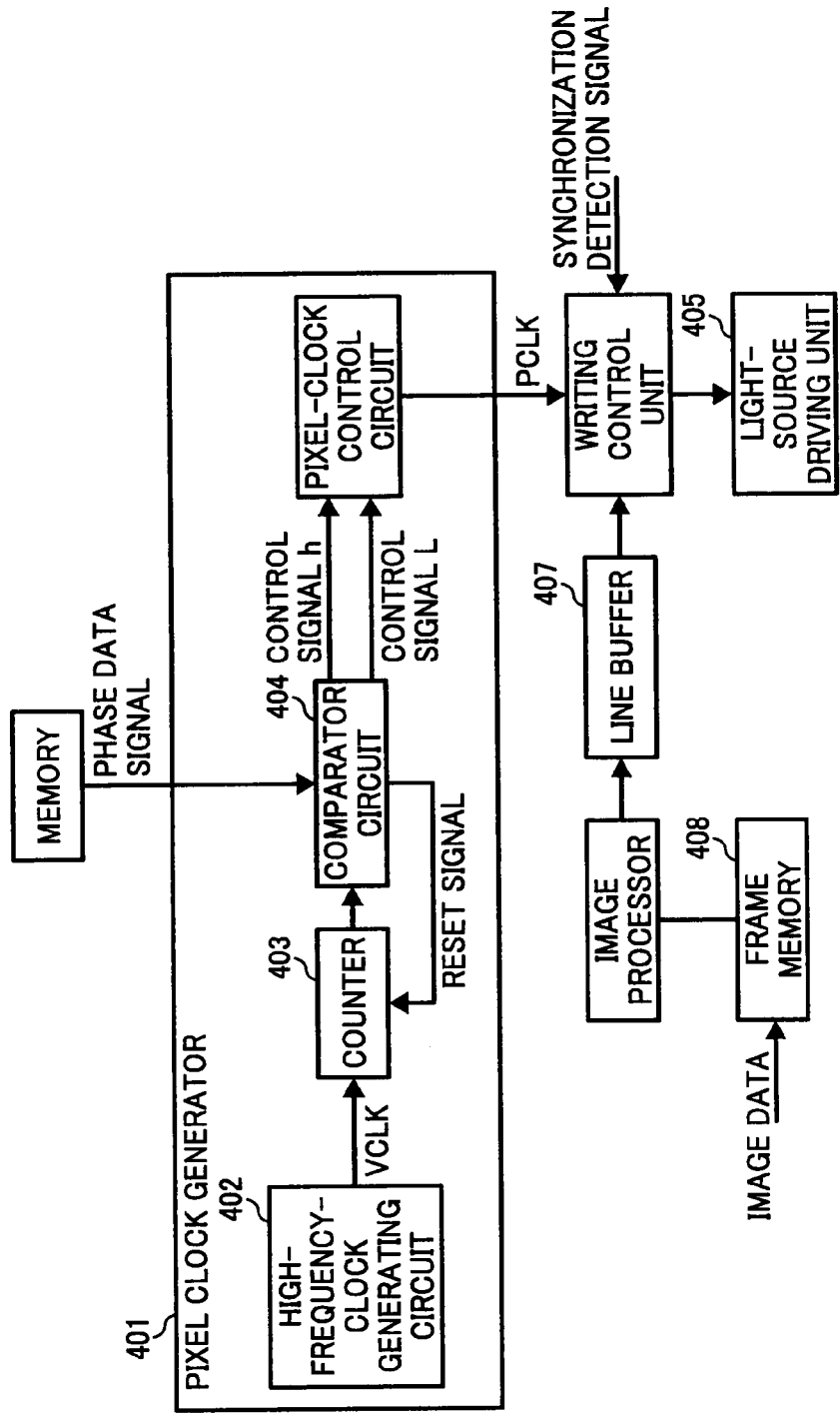
FIG. 4 is a block diagram of a drive circuit that modulates a semiconductor laser as a source of luminescence.

FIG. 4 is a block diagram of a drive circuit that modulates the semiconductor laser as a source of luminescence. In FIG. 4, reference numeral 401 denotes a pixel clock generator, 402 denotes a high-frequency-clock generating circuit, 403 denotes a counter, 404 denotes a comparator circuit, 405 denotes a light-source driving unit, 407 denotes a line buffer, and 408 denotes a frame memory.

Image data raster-expanded for each color is temporarily stored in the frame memory 408, sequentially read by an image processor so that pixel data of each line is formed in accordance with a matrix pattern corresponding to a grey level by referring to a context, and the image data is transferred to the line buffer 407 corresponding to each source of luminescence. A writing control circuit reads a synchronization detection signal, respectively, from the line buffer 407 as a trigger to modulate the synchronization detection signal independently.

The pixel clock generator 401 that modulates each luminous point is explained next. The counter 403 counts a high-frequency clock VCLK generated by the high-frequency-clock generating circuit 402. The comparator circuit 404 compares the count value with a set value L preset based on a duty ratio, and with phase data H provided from outside as a transition timing of a pixel clock and indicating a phase shift amount. When the count value matches the set value L, the comparator circuit 404 outputs a control signal L specifying a trailing edge of the pixel clock PCLK, and when the count value matches the phase data H, the comparator circuit 404 outputs a control signal h specifying a leading edge of the pixel clock PCLK. At this time, the counter 403 is reset simultaneously with the control signal h, to start counting from zero again, thereby enabling to form a continuous pulse string.

In this manner, the comparator circuit 404 provides the phase data H for each of one clock, to generate the pixel clock PCLK in which the pulse period is made variable sequentially. In the first embodiment, the pixel clock PCLK is obtained by dividing the high-frequency clock VCLK by eight, so that the phase can be varied with a resolution of 1/8 clock.

Figure 5:
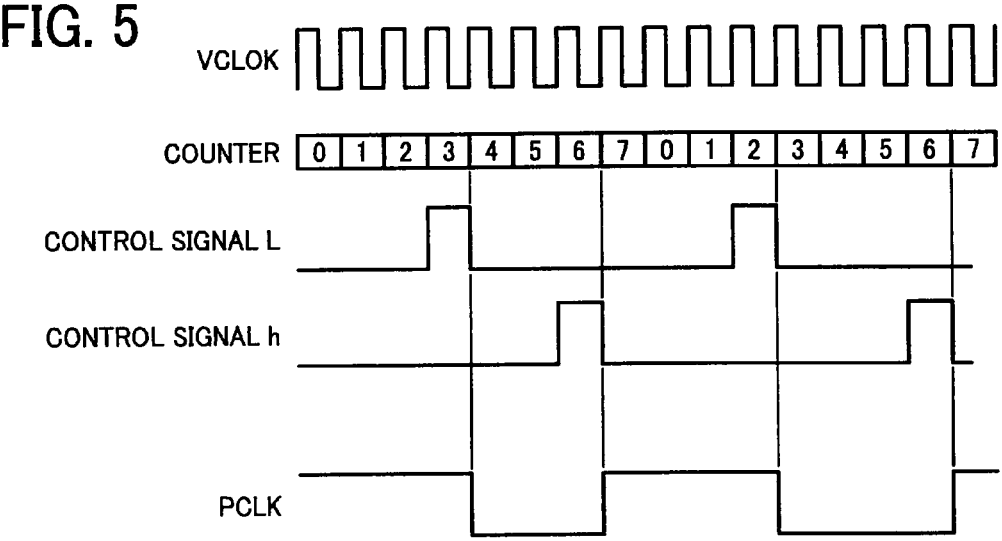
FIG. 5 is a schematic diagram for explaining shifting of a phase of an arbitrary pixel.

FIG. 5 is a schematic diagram for explaining shifting of the phase of an arbitrary pixel, representing an example in which the phase is retarded by 1/8 clock.

When it is assumed that the duty is 50%, a set value L=3 is provided, and the counter 403 counts four, to allow the pixel clock PCLK to fall. When it is assumed that the phase is retarded by 1/8 clock, phase data H=6 is provided, to allow the pixel clock PCLK to rise after seven counts. At the same time, because the counter 403 is reset, the pixel clock PCLK is allowed to fall after four counts. That is, it means that an adjacent pulse period is shortened by 1/8 clock.

The pixel clock PCLK generated in this manner is provided to the light-source driving unit 405, to drive the semiconductor laser by modulation data in which the pixel data read from the line buffer 407 is superimposed on the pixel clock PCLK.

Figure 6:
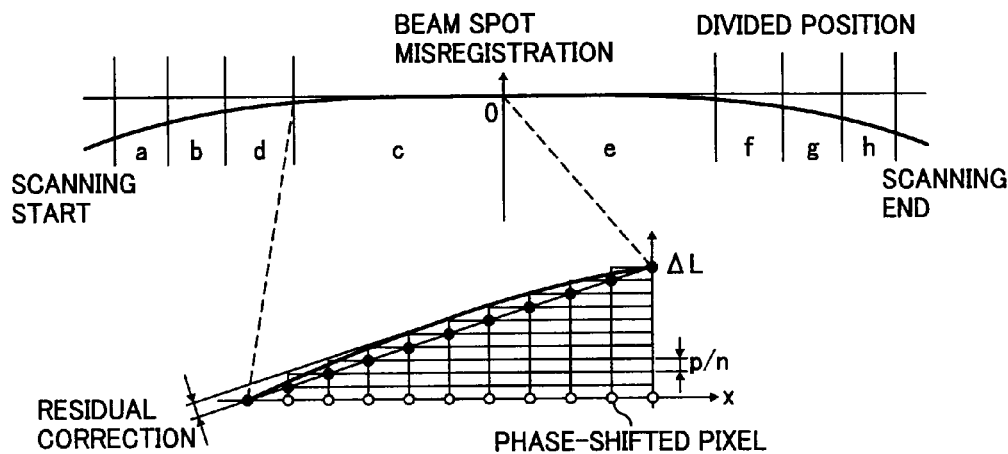
FIG. 6 is a schematic diagram for explaining a correction principle.

FIG. 6 is a schematic diagram for explaining a correction principle. FIG. 6 indicates a correction amount of a beam reach position in each pixel corresponding to the main scanning direction at the time of modulation with a single frequency. The main scanning area is divided into a plurality of areas, in the first embodiment, into eight areas of "a" to "h", and the number of phase shifts is set for each area so that main scanning misregistration becomes zero at a boundary between respective areas by piecewise linear approximation, to perform correction stepwise.

For example, when it is assumed that the number of pixels in area i is Ni, a shift amount in each pixel is 1/16 unit of pixel pitch p, and a deviation at the main scanning reach position at opposite ends of each area is $\Delta Li$, $$ni = Ni \cdot p / 16 \Delta Li,$$

and the phase needs only to be shifted for each of ni pixels.

When a pixel clock is assumed to be fc, a total phase difference $\Delta t$ is expressed by:

$$\Delta t = 1/16 fc \times \int (Ni/ni) di$$

by using the number of phase shifts Ni/ni, and a phase difference $\Delta t$ in a pixel of the Nth dot can be also set according to the number of phase shifts accumulated so far in the same manner.

Figure 7A:
FIGS. 7A and 7B are schematic diagrams of an example in which a turn-on timing of a light source is individually set.
Figure 7B:

FIGS. 7A and 7B are schematic diagrams of an example in which a turn-on timing of the light source is individually set, where FIG. 7A depicts a case that the turn-on timing is not changed, and FIG. 7B depicts a case that the turn-on timing is changed.

When it is set that the turn-on timing is changed in 1/16 unit of pixel pitch p for each of ni pixels obtained in each area, the main scanning misregistration becomes zero at a boundary between respective areas.

In the first embodiment, the linearity decreases as moving toward the peripheral image height. Therefore, when the frequency of the image signal and the turn-on timing in each pixel are a unit of constant in one line, as shown in FIG. 7A, a dot interval becomes narrower as moving toward the periphery, thereby causing a magnification error on an image. However, by setting the turn-on timing for each pixel by the phase shift, as shown in FIG. 7B, although a main scanning width of exposure distribution decreases as moving to the periphery, an interval for each pixel in the main scanning direction of exposure distribution can be equalized. Furthermore, although an integral amount of light of each pixel becomes different, the integral amount of light of exposure distribution can be equalized for each pixel by arranging in the light-source driving unit a unit that individually sets the lighting time for each pixel in one line. Alternatively, emission intensity of the light source is individually set for each pixel in one line, thereby enabling to equalize the integral amount of light of exposure distribution for each pixel.

The spot position of the light beam in the main scanning direction on the scanning surface can be uniformly scanned, by equalizing the interval between respective pixels in the main scanning direction of the exposure distribution and the integral amount of light for each pixel. That is, the magnification error on the image, which occurs due to optical performance, can be offset by electrical correction, thereby obtaining a much better scanning constant-speed characteristic.

The divided area width can be equal or unequal, and the number of division can be any number. However, when the shift amount increases in each pixel, a difference in level is noticeable in the image. Therefore, it is desired to set the area width equal to or less than 1/4 unit of the pixel pitch p. On the contrary, if the phase shift amount decreases, the number of phase shifts increases, to increase an amount of memory. Furthermore, as the number of division decreases, the amount of memory decreases. Therefore, it is efficient to set an area width of an area having a large misregistration of the main scanning reach position to be small, and an area width of an area having a small misregistration to be large.

The output of the semiconductor laser is generally detected before back light reaches the image area for one scanning by a sensor for monitoring the amount of light installed in the same package, and an amount of current to be applied to the source of luminescence is controlled so that a constant value is maintained during recording of one line.

Figure 8:
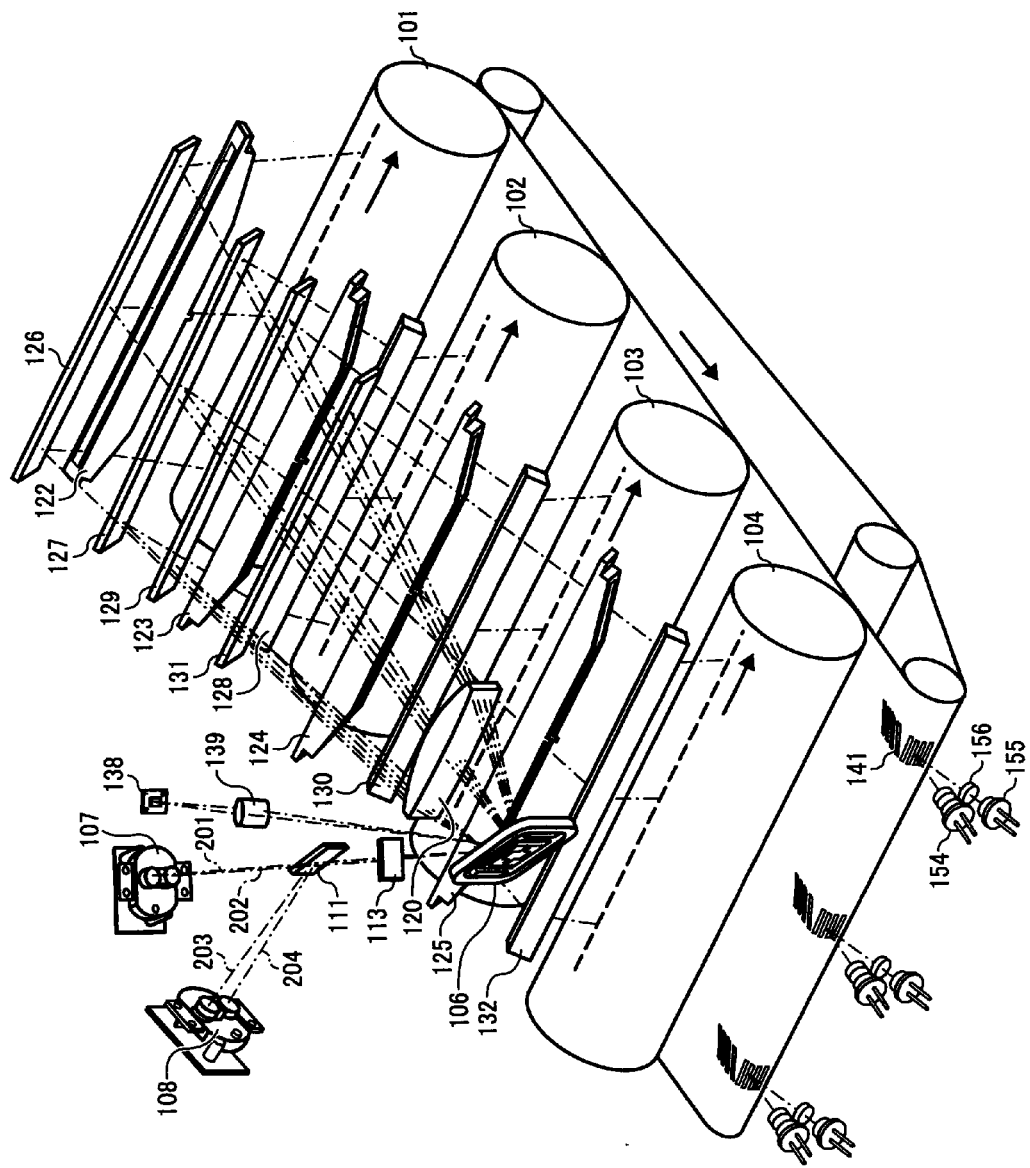
FIG. 8 is a schematic diagram for explaining a method of scanning four stations by a single oscillation mirror according to a second embodiment of the present invention.

FIG. 8 depicts a method of scanning four stations by a single oscillation mirror according to a second embodiment of the present invention. In FIG. 8, reference numeral 106 denotes an oscillation mirror. Like reference numerals refer to like parts as those in FIG. 1.

In the second embodiment, the beams from respective light source units are made to be obliquely incident on the oscillation mirror 106 at different angles of incidence in the sub-scanning direction, thereby deflecting to scan the beams from the respective light source units collectively. By scanning a plurality of scanning areas by one oscillation mirror, low cost can be realized, and adjustment of resonance frequency, drive frequency, amplitude, and deflection angle is not required, which is essential at the time of using a plurality of oscillation mirrors, thereby enabling to shorten a manufacturing process and improve the optical performance.

In the light source units 107 and 108, light sources for two stations are arranged in the sub-scanning direction, adjusted so that an angle between light beams from the respective light sources becomes 2.4 degrees, and integrally supported so that the light beams intersect with each other in the sub-scanning direction on an oscillation mirror plane of the oscillation mirror 106. Each of the light sources has two luminous points; in FIG. 8, however, only an optical path of the beam from one representative luminous point is shown.

Figure 9A:
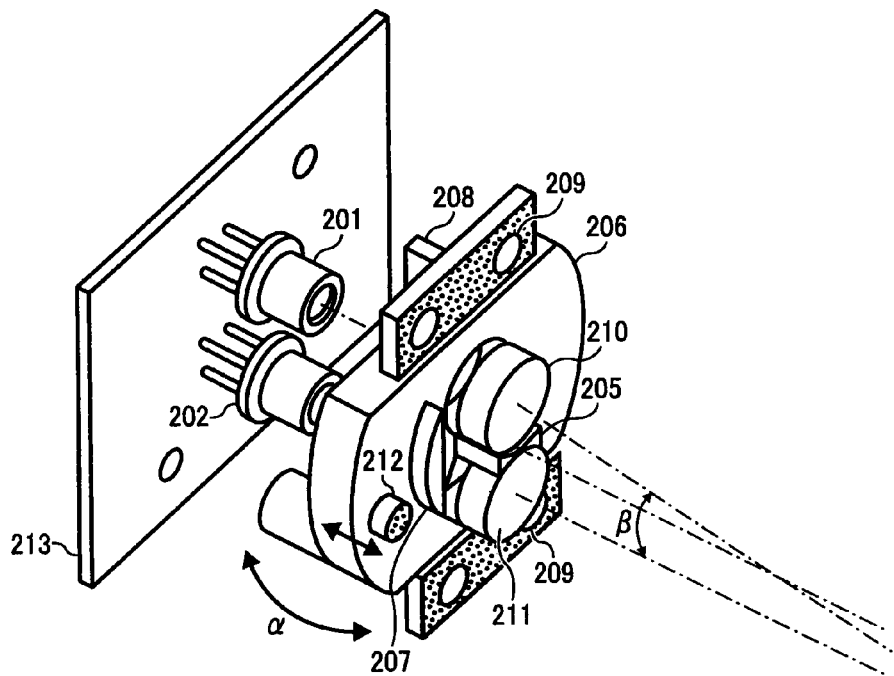
FIGS. 9A and 9B are perspective views of a light source unit according to the second embodiment.
Figure 9B:
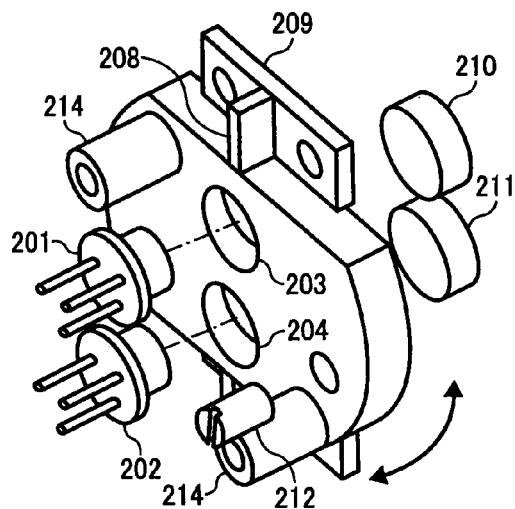

FIGS. 9A and 9B are perspective views of the light source unit in the second embodiment.

In the second embodiment, the light source unit 107 is arranged so that the beam from a lower light source inclines upward by 1.5 degrees and the beam from an upper light source inclines downward by 3.3 degrees with respect to the emission axis C, and the emission axis C inclines downward by 0.9 degree with respect to a main scanning plane. On the other hand, the light source unit 108 is arranged so that the beam from an upper light source inclines downward by 1.5 degrees and the beam from a lower light source inclines upward by 3.3 degrees with respect to the emission axis C, and the emission axis C inclines upward by 0.9 degree with respect to a main scanning plane. The light source units 107 and 108 are arranged, with an installation height being changed in the sub-scanning direction, so that the emission axis C of the light source units 107 and 108 intersects with each other in the sub-scanning direction on the oscillation mirror plane.

The light source unit 108 is arranged at a lower position than the light source unit 107 in the sub-scanning direction. The beams 201, 202, 203, and 204 from respective light sources are made incident on the cylinder lens 113 by an incident mirror 111, with the height thereof being made different in the sub-scanning direction, so that the beams are aligned in a vertical row, the angle of incidence in the main scanning direction becomes 22.5 degrees (=α/2+0d), respectively, with respect to a normal of the oscillation mirror 106, and the beams intersect with each other in the sub-scanning direction on the oscillation mirror plane.

The respective beams are converged in the sub-scanning direction near the plane of the oscillation mirror by the cylinder lens 113, and after being deflected, incident on a first scanning lens 120, with the gap therebetween being enlarged so that the beams are separated from each other.

The first scanning lens 120 is shared by all stations, and does not have a converging power in the sub-scanning direction.

The lower beam 204 from the light source unit 108, of the beams from the respective light source units having passed through the first scanning lens 120, is reflected by the folding mirror 126, and focused in a spot on the photosensitive drum 101 via a second scanning lens 122, to form a latent image based on image information of yellow color as a first image forming station.

The upper beam 203 from the light source unit 108 is reflected by the folding mirror 127 and focused in a spot on the photosensitive drum 102 via a second scanning lens 123 and the folding mirror 128, to form a latent image based on image information of magenta color as a second image forming station.

The upper beam 201 from the light source unit 107 is reflected by a folding mirror 129 and focused in a spot on the photosensitive drum 103 via a second scanning lens 124 and the folding mirror 130, to form a latent image based on image information of cyan color as a third image forming station.

The lower beam 202 from the light source unit 107 is reflected by the folding mirror 131 and focused in a spot on the photosensitive drum 104 via a second scanning lens 125 and the folding mirror 132, to form a latent image based on image information of black color as a fourth image forming station.

As the angle of oblique incidence in the sub-scanning direction with respect to the oscillation mirror 106 increases, the optical performance such as scanning line curvature tends to deteriorate. Deterioration of the scanning position of black color is most noticeable as image degradation, and therefore in the second embodiment, a black image is formed with the beam 202 having the small angle of oblique incidence.

With regard to the synchronization detection sensor, as in the first embodiment using the polygon mirror, the optical beams deflected by the oscillation mirror 106 pass by the side of the first scanning lens 120, and are focused by the imaging lens 139, to be incident on the synchronization detection sensor 138. The synchronization detection sensor 138 generates a synchronization detection signal for each station based on the detection signal thereof.

Figure 10:
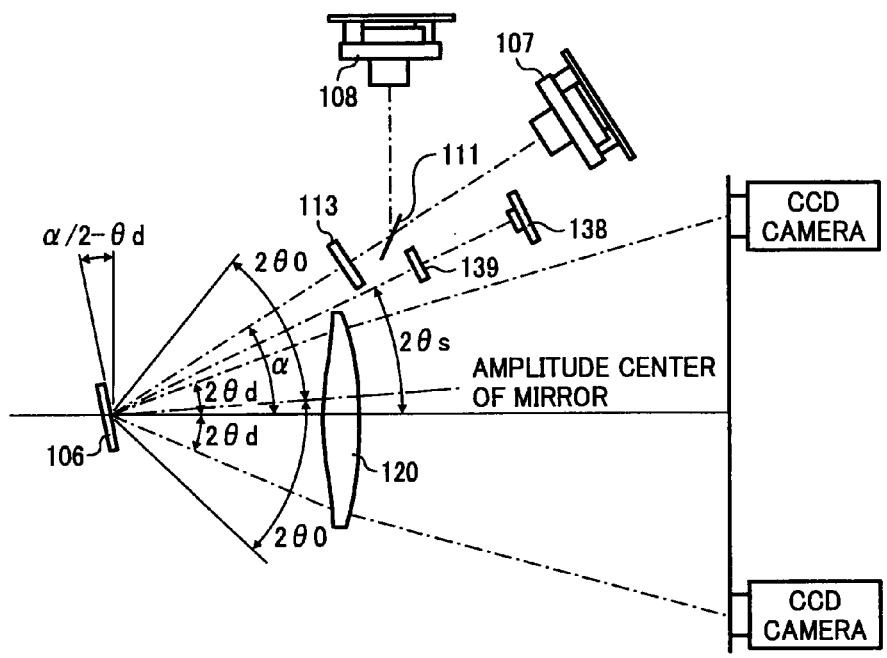
FIG. 10 is a schematic diagram for explaining an angle arrangement of light beam.

FIG. 10 is a schematic diagram for explaining an angle arrangement of light beam.

In the second embodiment, a mean angle of incidence α of the optical beams from the light source is set to achieve following relationships:

$$00 \geq \alpha/2 > 0d, \text{ and}$$

$$00 \geq 0s > 0d,$$

where 0d denotes an effective deflection angle for scanning on the photoconductor, and 0s denotes a deflection angle at the time of synchronization detection, to suppress an effective scanning rate (0d/00) to a predetermined value or less, specifically, equal to or less than 0.6. The reason why the effective scanning rate is set to 0.6 or less is to use the light beam within a range of the deflection angle, which is a scanning characteristic closer to constant speed.

Specifically, 00=25°, 0d=15°, α=45°, and 0s=18°.

The synchronization detection sensor can be arranged so that 0s>α/2 is achieved.

In FIG. 10, an example in which an amplitude center does not match an optical axis of the scanning lens, that is, the amplitude center is shifted toward the optical source to generate vibration is shown. However, in the second embodiment, an arrangement in which the amplitude center matches the optical axis of the scanning lens is adopted, and the plane shapes of the scanning lens or the second scanning lenses are curved shapes symmetrical along the main scanning direction.

The lens surface of the first scanning lens 120 close to the oscillation mirror 106 is designated as the plane of incidence 120a, and the lens surface far from the oscillation mirror 106 is designated as the plane of emission 120b. The distance from the oscillation mirror 106 to the plane of incidence 120a is 28 millimeters, the distance from the plane of emission 120b to planes of incidence 122a, 123a, 124a, and 125a of the respective second scanning lenses 122, 123, 124, and 125 is, respectively, 128 millimeters, and the distance from planes of emission 122b, 123b, 124b, and 125b of the respective second scanning lenses 122, 123, 124, and 125 to the surfaces of the respective photosensitive drums 101, 102, 103, and 104 is, respectively, 79.5 millimeters.

When the paraxial radius of curvature in the main scanning direction is denoted by Rm, the paraxial radius of curvature in the sub-scanning direction is denoted by Rs, the thickness of the scanning imaging lens is denoted by D, and the refractive index in used wavelength of 780 nanometers is denoted by N, design data of each plane is as shown in Table 5 below. The second scanning lens is shared by the respective stations and the same lens is used, and therefore the data of the second scanning lens 122 is shown representatively.

TABLE 5

| Plane | Rm | Rs | D | N |
|---|---|---|---|---|
| 120a | −151.28 | ∞ | 5 | 1.5240 |
| 120b | −63.73 | ∞ | | |
| 122a | −1606.03 | 28.28 | 3.5 | |
| 122b | −1614.57 | ∞ | | |

Each coefficient in the above equation (1) in each plane is as described below.

(Plane 120a)

$a_4 = -3.22E{-}06$ $a_6 = 1.63E{-}09$ $a_8 = 1.13E{-}11$ $a_{10} = -2.44E{-}14$ $a_{12} = 1.12E{-}17$ (Plane 120b)

$a_4 = -2.37E{-}06$ $a_6 = 1.59E{-}09$ $a_8 = -2.55E{-}12$ $a_{10} = 1.39E{-}14$ $a_{12} = -2.05E{-}17$ $b_2 = 2.27E{-}05$ $b_4 = -1.28E{-}09$ (Plane 122a)

$a_4 = -7.76E{-}07$ $a_6 = 2.70E{-}10$ $a_8 = -3.80E{-}14$ $a_{10} = 1.66E{-}18$ $a_{12} = 2.74E{-}23$ $b_2 = -1.06E{-}06$ $b_4 = 4.34E{-}10$ $b_6 = -2.58E{-}13$ $b_8 = 6.15E{-}17$ $b_{10} = -6.12E{-}21$ $b_{12} = 2.16E{-}25$ (Plane 122b)

$a_4 = -7.18E{-}07$ $a_6 = 2.15E{-}10$ $a_8 = -2.41E{-}14$ $a_{10} = 9.75E{-}20$ $a_{12} = 9.23E{-}23$ $f_2 = -2.60E{-}08$ $f_4 = -1.35E{-}11$

Figure 11:
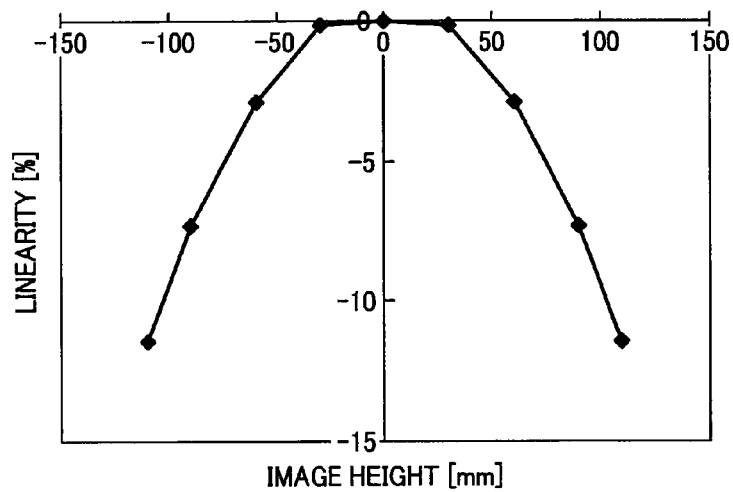
FIG. 11 is a graph representing a relationship between linearity and image height.

FIG. 11 depicts linearity at each image height. The linearity in the second embodiment is as shown in Table 6 below. As seen from Table 6 and FIG. 11, the linearity takes the maximum value at the central image height (image height of 0 millimeter) in the active writing area, and has a symmetrical shape therefrom so that the linearity at the image heights at the opposite ends becomes substantially equal. By setting the linearity in this manner, the amplitude center of the oscillation mirror and the center of the active writing area substantially match each other, and the linearity generated inevitably and a difference in the beam spot size can be suppressed to the minimum.

TABLE 6

| | Image height [mm] | | |
|---|---|---|---|
| | −108 | 0 | +108 |
| Linearity [μm] | −11.4 | 0.0 | −11.4 |

Figure 12:
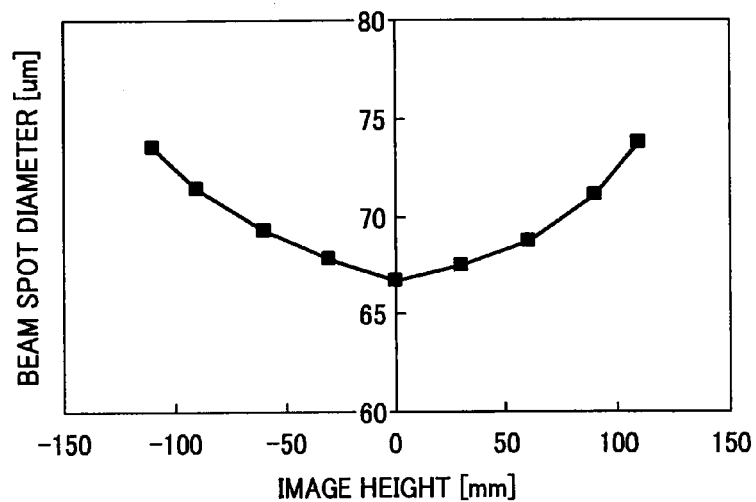
FIG. 12 is a graph representing a relationship between static beam spot size and image height.

FIG. 12 depicts a static beam spot size at each image height. At this time, in the scanning lenses 120, 122, 123, 124, and 125, the static beam spot size in the main scanning direction at each image height is set as shown in Table 7 below. As seen from Table 7 and FIG. 12, the static beam spot size takes the minimum value at the central image height (image height of 0 millimeter) in the active writing area, and has a symmetrical shape therefrom so that the static beam spot size at the image heights at the opposite ends becomes substantially equal. By setting the static beam spot size in this manner, the amplitude center of the oscillation mirror and the center of the active writing area substantially match each other, and the linearity generated inevitably and a difference in the beam spot size can be suppressed to the minimum.

TABLE 7

| | Image height [mm] | | |
|---|---|---|---|
| | −108 | 0 | +108 |
| Static beam spot size in main scanning direction [μm] | 73.8 | 66.5 | 73.6 |

The static beam spot size shown in Table 7 and FIG. 12 has a value such that the scanning beam spot size becomes uniform. The scanning beam spot size at each image height when scanning one dot (42.3 micrometers) of 600 dpi becomes as shown in Table 8 below, thereby reducing the ratio deviation of the static beam spot size of 11.0% between image heights in Table 7 to 2.3%. By equalizing the scanning beam spot size, taking into consideration the scanning speed at each image height, exposure stability at each dot position in the active writing area for forming the image can be increased, thereby enabling to form a stable image.

TABLE 8

| | Image height [mm] | | |
|---|---|---|---|
| | −108 | 0 | +108 |
| Scanning beam spot size [μm] | 91.6 | 89.5 | 91.6 |

Figure 13:
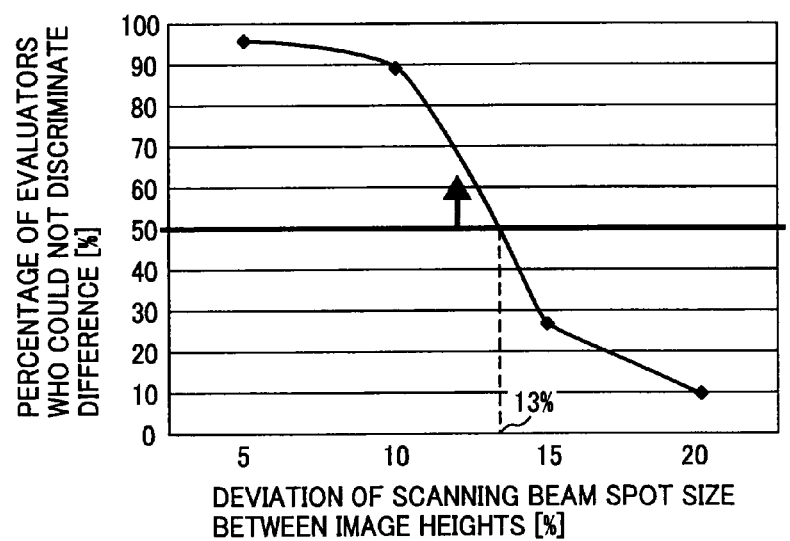
FIG. 13 is a graph representing a result of a sensory evaluation of density irregularity of a full color image.

FIG. 13 depicts a result of a sensory evaluation of density irregularity of a full color image. When complete constant-speed scanning on the scanning surface is assumed, the ratio deviation of 11.0% of the static beam spot size between image heights shown in Table 7 becomes directly the ratio deviation of the scanning beam spot size between image heights.

The ratio deviation of the scanning beam spot size between image heights causes density irregularity in the case of a monochrome image forming apparatus, or causes density irregularity and deterioration of color in the case of a color image forming apparatus to affect the image. FIG. 13 depicts a discrimination degree of density irregularity and color by the sensory evaluation obtained by an image output experiment by a full-color image forming apparatus. When the ratio deviation of the scanning beam spot size between image heights exceeds 13%, the discrimination degree falls below a 50% line, which is a border of a region having less influence on the image. Therefore, by suppressing the ratio deviation of the scanning beam spot size between image heights to 13% or less, an optical scanning device having less influence on the image can be obtained.

More preferably, it is desired to suppress the ratio deviation of the scanning beam spot size between image heights to 10% or less. In FIG. 13, when the ratio deviation of the scanning beam spot size between image heights exceeds 10%, the discrimination degree of density irregularity and color deterioration steeply increases. When tolerance variation and difference with time are taken into consideration, an optical scanning device having higher image stability can be provided by setting the ratio deviation of the scanning beam spot size between image heights to 10% or less.

In the second embodiment, the ratio deviation of the scanning beam spot size between image heights of 10% or higher, at which image degradation becomes noticeable, can be reduced to 2.3% by designing the beam spot size, taking the scanning speed into consideration, thereby enabling to form a high quality image.

The static beam spot size at the peripheral image height is suppressed to +21 micrometers or less of the static beam spot size at the central image height. When a difference of the static beam spot size between the central image height and the peripheral image height is large, it is necessary to increase the scanning speed at the central image height to make the static beam spot size at the central image height at least larger than that at the peripheral image height. Therefore, when the static beam spot size at the peripheral image height is larger than that at the central image height by 21 micrometers or more, equalization can be achieved only with a value of the scanning beam spot size of the whole active writing area, which is larger than the static beam spot size at the central image height by 21 micrometers.

Also in the second embodiment, the scanning beam spot size can be equalized in the whole active writing area. However, because the scanning speed is different at each image height, the dot position in the main scanning direction needs to be adjusted. Therefore, dot position correction in the main scanning direction is performed simultaneously.

When the oscillation mirror is used for the optical deflecting unit, a large linearity error occurs due to the scanning characteristic of the deflector, and a threshold limit thereof is set to −12.5% or higher. This is due to the following reason.

Figure 14:
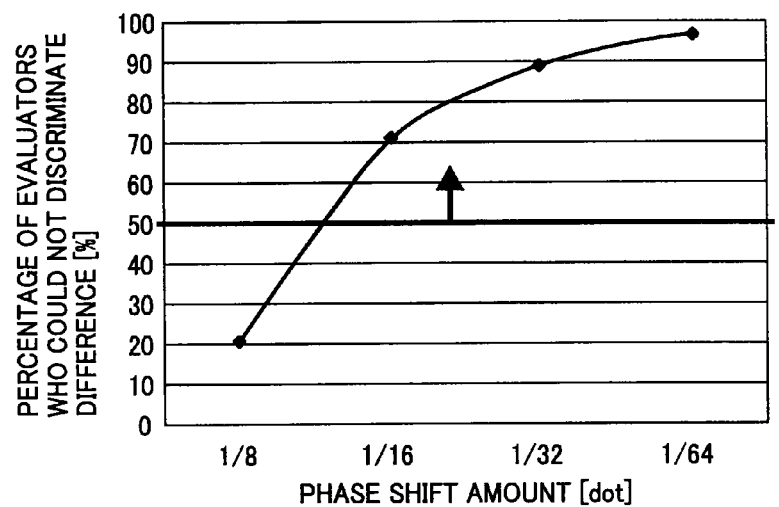
FIG. 14 is a graph representing a discrimination degree of a density difference by the sensory evaluation.

FIG. 14 depicts the discrimination degree of a density difference by the sensory evaluation. In FIG. 14, the horizontal axis plots a phase shift amount in each pixel, and the value, for example, a value of 1/16 dot indicates that a shift amount in each pixel is in a unit of 1/16 of a pixel pitch. The vertical axis plots a percentage of evaluators who could not discriminate the density difference, and indicates that as the value increases, image degradation at the time of applying electrical correction is suppressed more. According to FIG. 14, when the shift amount in each pixel is equal to or less than the unit of 1/16 of the pixel pitch, evaluators of 50% or more cannot discriminate the density difference, and image degradation can be suppressed. Therefore, a threshold correction amount is set to the unit of 1/16(±12.5%) of the pixel pitch.

If it is attempted to control a light source clock exceeding the threshold correction amount, another adverse effect such as a density difference occurs in the image quality to correct the linearity, thereby causing degradation of the image quality.

Due to the above reason, in the second embodiment, the minimum linearity generated at the opposite ends is set to −11.4%, thereby enabling to provide a stable image without degradation.

It is more preferable to set the minimum linearity generated at the opposite ends to −10% or higher. This is due to the following reason. That is, when the scanning optical system is actually assembled or there is a change with lapse of time, there may be a deviation, for example, between the amplitude center of the oscillation mirror and the center of the active writing area. In this case, even if the minimum linearity is set to −12.5% for a design central value, the linearity at the opposite ends falls under −12.5% due to the deviation. Therefore, the light source clock needs to be controlled exceeding the threshold correction amount, and as a result, degradation of the image quality occurs.

Due to the above reason, if the minimum linearity at the opposite ends is set to −10% or higher, an optical scanning device having a high robustness of the image with respect to assembly of the scanning optical system or the change with lapse of time can be provided.

In the second embodiment, the minimum linearity generated at the opposite ends is set to −11.4%. However, by adjusting a drive voltage of the oscillation mirror and setting an amplitude thereof to 00=26°, the linearity at the opposite ends can be made −9.6%, thereby enabling to provide a more excellent optical scanning device that can provide an image having a high robustness.

Figure 15:
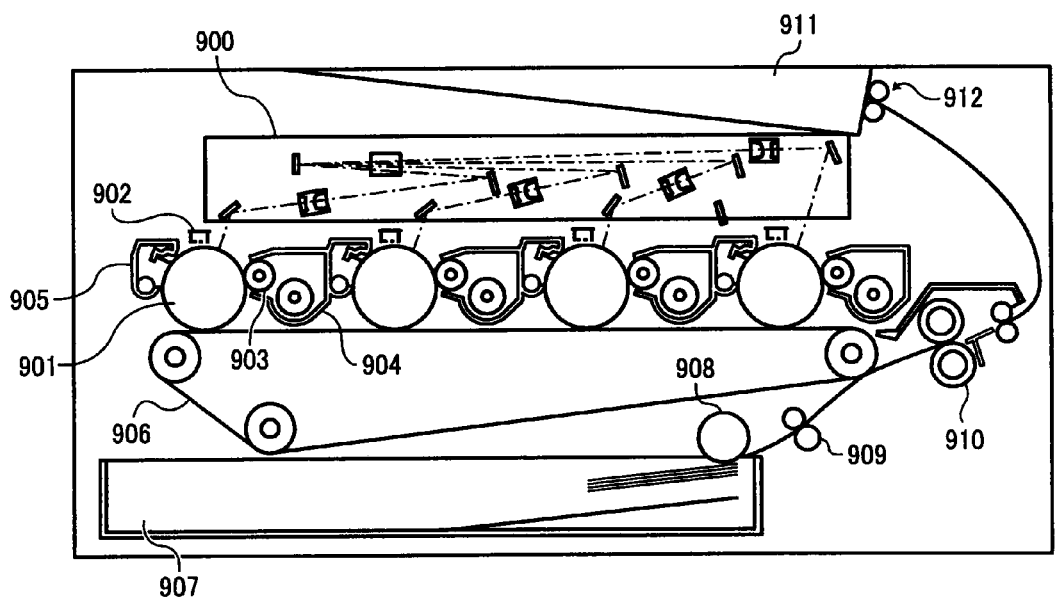
FIG. 15 is a schematic diagram of an example of an image forming apparatus that includes an optical scanning device.

FIG. 15 is a schematic diagram of an example of a full-color tandem image forming apparatus that includes the optical scanning device 900. In FIG. 15, reference numeral 901 denotes a photosensitive drum, 902 denotes a charger, 903 denotes a developing roller, 904 denotes a toner cartridge, 905 denotes a cleaning case, and 906 denotes a transfer belt.

The charger 902 that charges the photoconductor to high voltage, the developing roller 903 that causes a charged toner to adhere to an electrostatic latent image recorded by the optical scanning device 900 to develop the latent image, the toner cartridge 904 that supplies the toner to the developing roller, and the cleaning case 905 that scrapes and stores the toner remaining on the drum are arranged around the photosensitive drum 901. Image recording is performed on the photosensitive drum for every two lines in one cycle by reciprocating scanning of the oscillation mirror.

The image forming station is arranged in the moving direction of the transfer belt 906, so that yellow, magenta, cyan, and black toner images are sequentially transferred onto the transfer belt 906, with the timing adjusted, and superimposed to form a color image. The respective image forming stations have basically the same configuration, with only the toner color being different.

Also in the monochrome image forming apparatus, the optical scanning device of the present invention can be applied to an optical writing unit.

By using the optical scanning device for the image forming apparatus, the scanning beam spot size can be equalized over the whole active writing area, thereby enabling to provide an image forming apparatus that can form an excellent image.

According to an aspect of the present invention, the scanning beam spot size at the time of taking the scanning speed into consideration can be maintained uniform over the whole active writing area and an excellent image can be formed, by setting the scanning imaging optical system so that the tradeoff relationship between the constant-speed characteristic and the deviation of the static beam spot size in the main scanning direction can be compensated.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device, comprising:
a light source that emits a light beam;
a driving unit that drives the light source to modulate the light beam in units of a single dot;
a deflecting unit that includes an oscillation mirror and deflects the light beam; and
a scanning optical system that guides the light beam deflected by the deflecting unit to a scanning surface having an active writing area for forming an image, wherein
the scanning optical system is configured to produce a static beam spot size that varies with the image height, wherein the static beam spot size is a beam spot size when an angle of the oscillation mirror is set in a static state so that the light beam becomes a predetermined image height, such that a scanning beam spot size, which is a beam spot size received on the scanning surface at each image height by light emission for one dot when the oscillation mirror is driven, is kept substantially constant; and
the static beam spot size at a central image height is smaller than that at image heights at opposite ends of the active writing area.

2. The optical scanning device according to claim 1, wherein the driving unit individually sets a turn-on timing of the light source for each pixel in a scanning line.

3. The optical scanning device according to claim 1, wherein the scanning optical system is configured to keep a deviation of the scanning beam spot size in the active writing area within ±10%.

4. The optical scanning device according to claim 1, wherein the scanning optical system corrects for a change in the scanning speed, and a residual correction of the scanning speed in the active writing area is equal to or less than 12.5%.

5. The optical scanning device according to claim 1, wherein the scanning optical system corrects for a change in the scanning speed, which is maximum at a substantially center of the active writing area.

6. The optical scanning device according to claim 1, wherein the scanning optical system corrects for a change in the scanning speed, wherein scanning speeds at a starting edge and an ending edge of the active writing area are substantially equal.

7. The optical scanning device according to claim 1, wherein the scanning optical system corrects for a change in the scanning speed, wherein scanning speeds at a starting edge and an ending edge of the active writing area are equal to or higher than 87.5% of a maximum scanning speed.

8. The optical scanning device according to claim 1, wherein the scanning optical system corrects for a change in the scanning speed, wherein scanning speeds at a starting edge and an ending edge of the active writing area are equal to or higher than 90% of a maximum scanning speed.

9. The optical scanning device according to claim 1, wherein the scanning optical system is configured to produce the static beam spot size to be minimum at a substantially center of the active writing area, relative to a beam spot size at other positions of the active writing area.

10. The optical scanning device according to claim 1, wherein the scanning optical system is configured to produce the static beam spot size so that the static beam spot size at a starting edge and at an ending edge of the active writing area are substantially equal.

11. The optical scanning device according to claim 1, wherein the scanning optical system is configured to produce the static beam spot size so that the static beam spot size at a starting edge and at an ending edge of the active writing area are equal to or smaller than a static beam spot at a central image height size plus 21 micrometers.

12. The optical scanning device according to claim 1, wherein the oscillation mirror performs sine wave oscillation.

13. The optical scanning device of claim 1, wherein the static beam spot size at the central image height is 7 $\mu m$ smaller that at the image heights at the opposite ends of the active writing area.

14. An image forming apparatus, comprising:
an image carrier for forming a latent image thereon;
a charging unit that charges the image carrier;
a latent-image forming unit that forms a latent image on the image carrier;
a developing unit that develops the latent image formed on the image carrier with toner to form a toner image on the image carrier;
a transfer unit that transfers the toner image formed on the image carrier onto a recording medium; and
a fixing unit that fixes the toner image transferred onto the recording medium, wherein
the latent-image forming unit includes an optical scanning device including
a light source that emits a light beam,
a driving unit that drives the light source to modulate the light beam in units of single dot,
a deflecting unit that includes an oscillation mirror and deflects the light beam, and
a scanning optical system that guides the light beam deflected by the deflecting unit to a scanning surface having an active writing area for forming an image, wherein
the scanning optical system is configured to produce a static beam spot size that varies with the image height, wherein the static beam spot size is a beam spot size when an angle of the oscillation mirror is set in a static state so that the light beam becomes a predetermined image height, such that a scanning beam spot size, which is a beam spot size received on the scanning surface at each image height by light emission for one dot when the oscillation mirror is driven, is kept substantially constant; and
the static beam spot size at a central image height is smaller than that at image heights at opposite ends of the active writing area.

15. The image forming apparatus according to claim 14, wherein the oscillation mirror performs sine wave oscillation.

* * * * *